United States Patent
Carter et al.

(10) Patent No.: US 7,996,517 B2
(45) Date of Patent: Aug. 9, 2011

(54) TRANSPARENT NETWORK CONNECTION TAKEOVER

(75) Inventors: Stephen R. Carter, Spanish Fork, UT (US); Howard Rollin Davis, Salem, UT (US)

(73) Assignee: Novell, Inc., Provo, UT (US)

( * ) Notice: Subject to any disclaimer, the term of this patent is extended or adjusted under 35 U.S.C. 154(b) by 826 days.

(21) Appl. No.: 11/483,811

(22) Filed: Jul. 10, 2006

(65) Prior Publication Data

US 2006/0253575 A1 Nov. 9, 2006

Related U.S. Application Data (63) Continuation-in-part of application No. 10/055,865, filed on Jan. 23, 2002, now Pat. No. 7,076,555.

(51) Int. Cl.
*G06F 15/173* (2006.01)

(52) U.S. Cl. ............ 709/224; 709/227; 714/1; 714/4.11

(58) Field of Classification Search .................. 709/227, 709/224; 714/1, 4.11
See application file for complete search history.

(56) References Cited

U.S. PATENT DOCUMENTS

| | | | |
|---|---|---|---|
| 4,811,337 A * | 3/1989 | Hart .............................. | 370/256 |
| 5,551,007 A * | 8/1996 | Miyazaki et al. ............. | 711/148 |
| 5,642,511 A | 6/1997 | Chow et al. | |
| 5,721,818 A * | 2/1998 | Hanif et al. .................... | 709/228 |
| 5,784,566 A | 7/1998 | Viavant et al. | |
| 5,828,569 A | 10/1998 | Fisher | |
| 5,924,116 A | 7/1999 | Aggarwal et al. | |
| 5,961,593 A | 10/1999 | Gabber et al. | |
| 5,964,891 A | 10/1999 | Caswell et al. | |
| 5,999,734 A | 12/1999 | Willis et al. | |
| 6,014,667 A | 1/2000 | Jenkins et al. | |
| 6,018,619 A | 1/2000 | Allard et al. | |
| 6,112,228 A | 8/2000 | Earl et al. | |
| 6,151,688 A | 11/2000 | Wipfel et al. | |
| 6,185,598 B1 | 2/2001 | Farber et al. | |
| 6,185,625 B1 | 2/2001 | Tso et al. | |
| 6,229,809 B1 | 5/2001 | Murphy et al. | |
| 6,237,142 B1 * | 5/2001 | Brodsky et al. ............... | 717/165 |
| 6,330,605 B1 | 12/2001 | Christensen et al. | |
| 6,490,610 B1 | 12/2002 | Rizvi et al. | |
| 6,826,613 B1 | 11/2004 | Wang et al. | |
| 6,862,606 B1 | 3/2005 | Major et al. | |
| 6,910,078 B1 | 6/2005 | Raman et al. | |
| 7,065,670 B2 | 6/2006 | Gahan et al. | |
| 7,287,090 B1 * | 10/2007 | Berg .............................. | 709/238 |
| 2002/0112189 A1 | 8/2002 | Syvanne et al. | |
| 2003/0014684 A1 * | 1/2003 | Kashyap ........................ | 714/4 |
| 2003/0039209 A1 | 2/2003 | Webber | |
| 2005/0138461 A1 | 6/2005 | Allen et al. | |
| 2006/0143618 A1 | 6/2006 | Fleischer et al. | |

\* cited by examiner

*Primary Examiner* — Jungwon Chang (74) *Attorney, Agent, or Firm* — Schwegman, Lundberg & Woessner, P.A.

(57) ABSTRACT

Techniques for the transparent takeover of network connections are presented. A first server is engaged in a connection with a client. The transactions of the connection and the traffic are monitored by a traffic cache manager. The first server records sequence numbers for the transactions with a synchronization store. If the first server fails, a last recorded sequence number is updated by the traffic cache manager within the synchronization store on behalf of a second server, which is to takeover the connection for the unresponsive first server.

23 Claims, 4 Drawing Sheets

TRANSPARENT NETWORK CONNECTION TAKEOVER

RELATED APPLICATION

The present application is with and is a Continuation-In-Part of U.S. application Ser. No. 10/055,865 entitled "System and Method for Transparent Takeover of TCP Connections between Servers," filed on Jan. 23, 2002, now issued as U.S. Pat. No. 7,076,555; the disclosure of which is incorporated by reference herein.

FIELD

The invention relates generally to network transactions and more particularly to transparent network connection takeover in the event of failures or unresponsiveness.

BACKGROUND

As more and more services become available over the Internet, service providers are finding it increasingly difficult to provide uninterrupted and high-availability (HA) service. Often service providers will deploy multiple servers that are each capable of providing a same service to a client and that each use proxy server architectures to load balance processing and accelerate processing.

An architecture that may be deployed by a service provider is a reverse proxy. With a reverse proxy requests made from a client over the Internet are intercepted by the reverse proxy before being routed to a target service for processing. This front-end processing permits the reverse proxy to accelerate client requests if content that can satisfy a client's request resides in cache. The reverse proxy can also load balance and in some cases perform authentication services on behalf of the target service. Other proxy arrangements may be used as well, such as forward proxies and transparent proxies.

When a client is engaged in transactions with a target service, a variety of situations may occur that can cause the connection between the client and the server associated with the service to fail or become unresponsive. If the problem is within an environment of the service provider, then the service provider can attempt to dynamically remedy the situation in an effort to enhance the client's experience with the service provider. The ability to seamlessly transition the client's session with the target service to a failover over server that also has another executing version of the target service is referred to HA. To do this transition, service providers may deploy a variety of architectures and/or techniques.

One technique is to have a mirrored server process in parallel everything the target service processes, such that when the server associated with the target service fails the mirrored service and target service can pick up uninterrupted processing. However, in many cases this may be a waste of resources and can quickly become unmanageable and expensive when multiple servers are processing client requests because each server may need to be mirrored.

Another technique and more efficient technique is to have a processing server record its transactions with a separate store, such that if the processing server fails a failover server can inspect the separate store and engage the client where processing left off before the failure occurred. Yet, this assumes that the processing server properly synchronized in a concurrent fashion with the separate store because any gap in synchronization can make failover difficult or in some cases impractical.

Thus, it is advantageous to provide improved techniques for transparent network connection takeovers in the event of communication failures.

SUMMARY

In various embodiments, techniques transparent network connection takeover are provided. More specifically, and in an embodiment, a method for facilitating a network connection takeover is presented. A connection over a network occurring between a first server and a client is monitored on the front-end of the first server. Next, the first server is detected as being unresponsive during the connection with the client. Finally, a synchronization store is updated with a current sequence number of a last transaction between the first server and the client when a last recorded sequence number in the synchronization store is less than the current sequence number. A second server uses the current sequence number to takeover the connection with the client on behalf of the unresponsive first server.

DETAILED DESCRIPTION

As used herein a "synchronization store" or a "shared connection store" and its contents can be found in U.S. patent application Ser. No. 10/055,865 entitled "System and Method for Transparent Takeover of TCP Connections between Servers;" the disclosure of which is incorporated by reference herein.

The synchronization store may be viewed as a data structure, memory, database, file, storage, an object-oriented (OO) class, or combination of these things. The synchronization store includes, among other things, acknowledgement identifiers sent from a processing server to a client during a session that the client has with the processing sever. That is, the client sends a message and that message has a packet or sequence number at a network communication layer; the processing server acknowledges each message with an acknowledgment and the acknowledgement has its own sequence number and the acknowledgment may also confirm the sequence number of the original client's message.

These transactions, which occur during a session between a client and a processing server, can be tracked based, at least in part, on the message and acknowledgement sequence numbers that occur at the Transmission Control Protocol TCP)/Internet Protocol (IP) (referred to as TCP/IP) network communication layer.

Various embodiments of this invention can be implemented in existing network architectures, security systems, and/or communication devices. For example, in some embodiments, the techniques presented herein are implemented in whole or in part in the Novell® network, proxy server products, email products, operating system products, and/or directory services products distributed by Novell®, Inc., of Provo, UT.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

Figure 1:
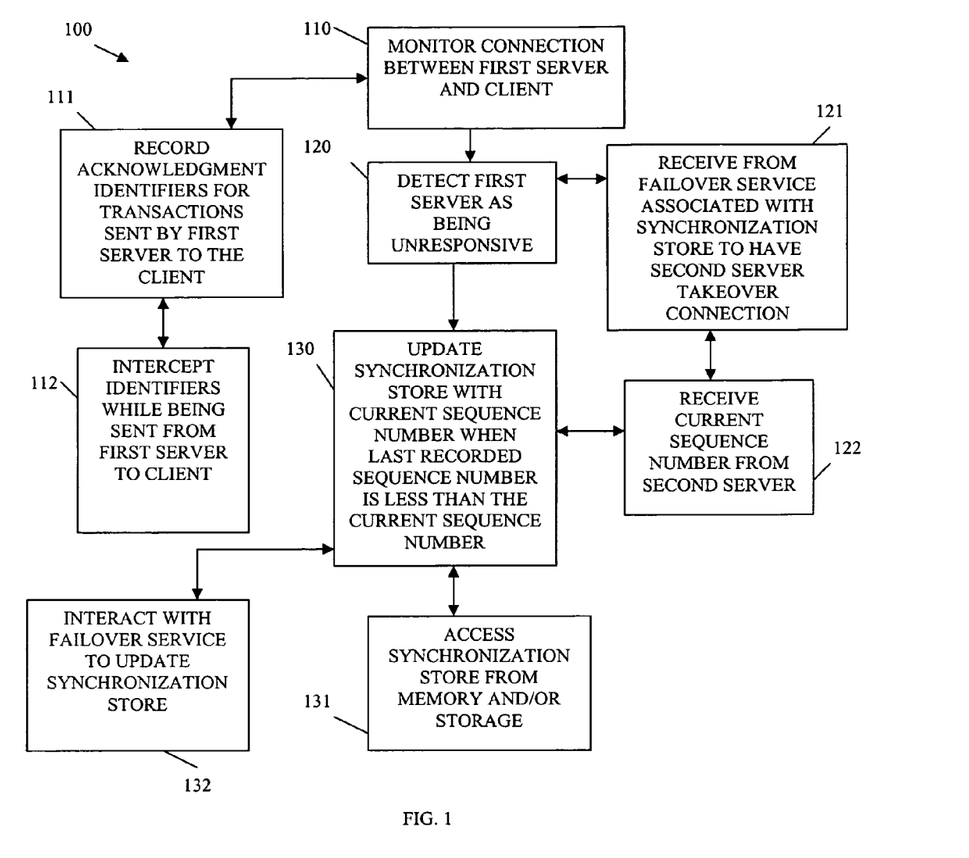
FIG. 1 is a diagram of a method for facilitating a transparent network connection takeover, according to an example embodiment.

FIG. 1 is a diagram of a method 100 for facilitating a transparent network connection takeover, according to an example embodiment. The method 100 (hereinafter "connection takeover service") is implemented in a machine-accessible and readable medium. The connection takeover service is operational over and processes within a network. The network may be wired, wireless, or a combination of wired and wireless.

In an embodiment, the connection takeover service may process on its own device within a local area network (LAN) or Intranet environment. Within the environment, a variety of other devices or proxy cache services process. These other devices have services that are accessible to external clients over the Internet. The environment is initially accessible via a router and perhaps a switch, which forwards client traffic directed to specific services to the proper device or proxy.

Initially, at least two servers or devices are processing within the same environment as the connection takeover service. At 110, the connection takeover service monitors a connection between a first server and a client. In some cases, at 111, this may entail recording acknowledgment identifiers for transactions sent by the first server to the client. That is, the client sends transactions and each transaction may consist of multiple data message packets at a network communication layer and for each of these transactions and packets the first server sends an acknowledgment. The transactions and acknowledgements are associated with unique identifiers or sequence numbers that permit a communication layer to keep things in synchronization and assure that transactions process in the proper order.

According to an embodiment, at 112, the connection takeover service intercepts the acknowledgment identifiers or sequence numbers and other data and metadata associated with the transactions as the first server sends them to the client and as the first server receives transactions from the client. These intercepted sequence and acknowledgement identifiers are kept by the connection takeover service independent of the other devices that process the services residing on the first server.

At some point in time, the first server may become unresponsive or may fail. At 120, this is detected by the connection takeover service. This may be detected by a proxy that monitors the connection between the first server and the client. The monitoring proxy may then inform a second server that it is to takeover the connection for the first server with the client.

In an embodiment, at 121, the connection takeover service is informed of the unresponsiveness of the first server by a failover service that maintains or monitors the synchronization store. At 122, this may occur when the second server makes a request to the failover service for a current sequence number of transactions that occurred between the client and the first server just before the first server became unresponsive. When the failover service receives this request, it checks the synchronization store to acquire the sequence number that the first server last successfully noted in the synchronization store and then makes a request to the connection takeover service for purposes of updating that sequence number. This sequence of events is one scenario by which the connection takeover service may detect that the first server is unresponsive or has failed.

The connection takeover service detects from the second server, another independent proxy, or on its own accord that the first server is not being responsive or has failed. This is an indication to the connection takeover service that the second server will need to have the latest processing state or last transaction, which was successfully processed by the first server in the connection with the client. Without the last successful transaction, the second server may not properly engage in the connection or may engage in the transaction at a point that has already transpired.

Once the connection takeover service is aware that the first server is unresponsive or has perhaps failed, then the connection takeover service, at 130, decides whether the synchronization store should be updated. The current sequence number that was last recorded by the first server may not have been the actual last transaction that the first server successfully processed before it failed. This can occur for a variety of reasons, such as the first server did not have time to record in the synchronization store multiple successful transactions before it failed or because communication with the synchronization was corrupted in some manner, and other situations. An update is necessary when the last recorded sequence number for a last recorded transaction is less than the actual current sequence number that has been noted by the connection takeover service during its monitoring of the connection between the first server and the client. The connection takeover service monitors the transactions independent of the first server and what it notes in the synchronization store.

According to an embodiment, at 131, the connection takeover service may access the synchronization store from shared storage, memory, etc. At 132, the connection takeover service may interact with a failover service that maintains the synchronization store for purposes of updating the last recorded sequence number with the proper and actual current sequence number.

The connection takeover service caches transactions and acknowledgements for communications that occur between the client and the first server during their connection with one another. It does this by intercepting communications from a network router or switch that forwards the traffic to the first server from the client and that routes the traffic from the first server out over the Internet to the client. The connection takeover service is not dependent upon actions of the first server to note the current sequence number of transactions and acknowledgements because it tracks these actions as traffic enters and leaves the local environment of the first server.

The first server attempts to record what it is doing in the synchronization store and attempts to do it in real time. However, as was noted above this is not always possible and a variety of situations may occur such that the first server may actually have processed a variety of additional transactions when the first server fails and at that point the first server may have only noted a particular transaction in the synchronization store that occurred several transactions after the failure occurred.

In these situations, the connection takeover service can be used to update the synchronization store on behalf of the second server that is transparently taking over the connection with the client on behalf of the first server. The connection takeover service does this by comparing the last recorded sequence number for a transaction or acknowledgement associated with the connection against what it knows to be the actual current sequence number. If the comparison demonstrates a discrepancy, the second server can use the cache of the connection takeover service to come up to date with the current sequence number for the proper and last successful transaction or acknowledgment between the client and the first server. In this manner, the connection can be maintained and transferred transparently to the second server from the first server even when the synchronization store appears to be out of date because of some failure in proper recordation by the first server before the first server failed.

Figure 2:
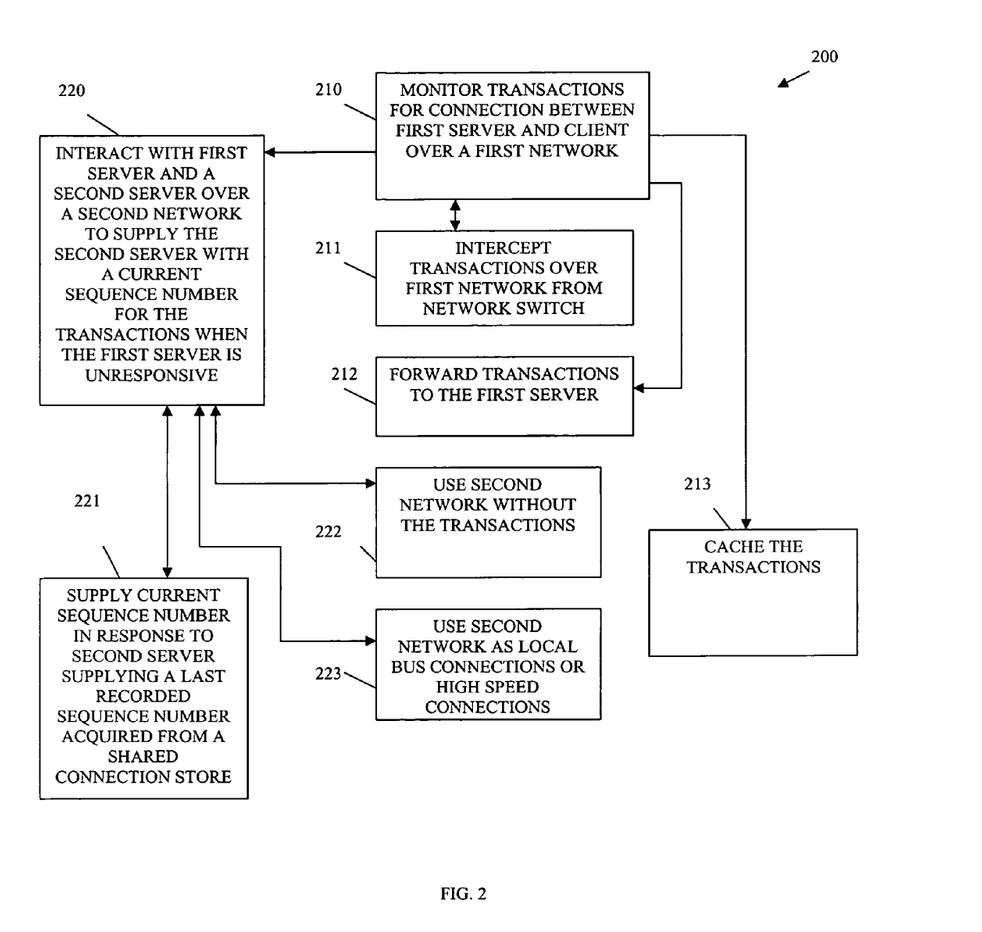
FIG. 2 is a diagram of another method for facilitating a transparent network connection takeover, according to an example embodiment.

FIG. 2 is a diagram of another method 200 for facilitating a transparent network connection takeover, according to an example embodiment. The method 200 (hereinafter "failover service" is implemented in a machine-accessible and readable medium and is operational over a network. The network may be wired, wireless, or a combination of wired and wireless. The processing of the failover service represents an alternative arrangement and interaction to the connection takeover server represented by the method 100 of the FIG. 1.

The failover service differs from the connection takeover service represented by the method 100 of the FIG. 1 in that the failover service processes in a different arrangement within the local environment of the first server and second server. The connection takeover service directly communicated with a failover service or the synchronization store and did not directly forward or interact with the first and second servers. Conversely, as will be demonstrated in the embodiment represented by the FIG. 2, the failover service does directly forward traffic and/or interact with the first and second servers and does not necessarily have to interact with the synchronization store or shared connection store.

Initially, the failover service is configured to process within two independent and local networks associated with first and second servers. The servers execute services that clients access from the Internet. The failover service and its device is positioned in between a network switch and the first and second servers. In the first network traffic between the client and the first server passes through the failover service before reaching the first server and before being injected over the Internet to the client. In a separate and independent second network, the failover service communicates current sequence numbers and makes its cached transactions available to a second server when the first server fails or becomes unresponsive. This interaction will now be discussed in greater detail.

At 210, the failover service monitors transactions over a first network occurring between a first server and a client. The first server is processing a service that the client is interacting with during a connection. That same service is capable of being processed on a second server should the first server fail or become unresponsive.

According to an embodiment, at 211, the failover service intercepts the transactions for the connection between the first server and the client from a network switch that is attempting to forward traffic to and from the first server and the client. That is, the failover service and the server or device it processes on is interposed in between the first server and the network switch. The network switch communicates with a router and the router injects traffic over the Internet that is destined for the client and initially receives traffic sent from the client that is destined for the first server. At 212, the failover service forwards traffic from the network switch to the first server during the connection between the first server and the client. At 213, the failover service caches the transactions as they occur during the connection and as they pass through the failover service.

At 220, the failover service interacts with the first server and a second server over a separate and independent network. The interaction permits the failover service to perhaps independently determine when the first server has become unresponsive or has failed and permits the failover service to update the second server with a current sequence number for a transaction or acknowledgment when the first server is unresponsive for purposes of maintaining the connection with the client and permitting the second server to transparently take over the network connection.

According to an embodiment, at 221, the failover service may supply the current sequence number for a last transaction or acknowledgement to the second server in response to a request for an update by the second server. So, the second server may consult a shared connection store or synchronization store for purposes of acquiring a last recorded sequence number for a transaction or acknowledgment as noted by the first server; but this may not be up-to-date, thus the second server further consults the failover service over the second network and supplies the last recorded sequence number. In response to this, the failover service updates and supplies the current and actual sequence number to the second server. This permits the second server to pick the connection up with the client where it left off, such that the client experience little to no delay and is unaware that the first server failed or became unresponsive.

In an embodiment, at 222, the second network is used without the traffic associated with the connection with the client. That is, the second network is not burdened with the traffic associated with the connection to the client. The second network is dedicated to communicating and updating sequence numbers for transactions or acknowledgements in the event that the first server fails or becomes unresponsive. This makes the transition of the connection to the second server quicker and more efficient. In some cases, at 222, the second network may be used as a local bus connections maintained between devices associated with the failover service and the first and second servers or may be used as high-speed connections between the devices.

Figure 3:
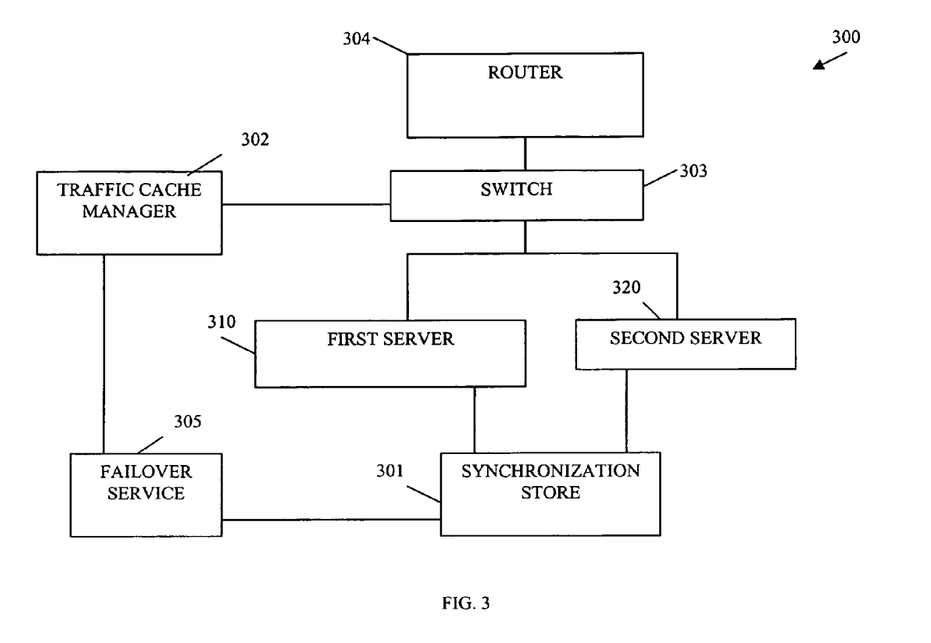
FIG. 3 is a diagram of network connection takeover system, according to an example embodiment.

FIG. 3 is a diagram of network connection takeover system 300, according to an example embodiment. The network connection takeover system 300 is implemented in a machine-accessible and readable medium and is operational over a network. The network may be wired, wireless, or a combination of wired and wireless. The network connection takeover system 300 implements, among other things, the processing associated with the connection takeover service represented by the method 100 of the FIG. 1.

The remote authorization system 300 includes a synchronization store 301 and a traffic cache manager 302. In some embodiments, the remote authorization system 300 may also include a network switch 303, a network router 304, and a failover service 305. Moreover, the environment of the remote authorization system 300 also includes a first server 310 and a second server 320. Each of these and the interactions of the components for the remote authorization system 300 will now be discussed in turn.

The synchronization store 301 is utilized to cache transactions and acknowledgements and data associated with a connection between a first server 310 and a client (not shown in FIG. 3). The contents of the information associated with the synchronization store 301 was discussed above and is incorporated by reference here with respect to the discussion of the FIG. 3. The first server 310 relays and communicates transactions and acknowledgements to the synchronization store 301. The synchronization store 301 may then be consulted for purposes of transparently maintaining a connection with a client and permitting that connection to be taken over by a second server 320 in the event that the first server 310 becomes unacceptably unresponsive of fails. This is done by the second server 320 receiving a designation that instructs it to takeover the connection and by the second server 320 consulting the synchronization store 301 to acquire a last recorded sequence number for a last known transaction or acknowledgement that occurred in the connection. However, this assumes that the first server 310 was diligent enough or fast enough to properly maintain what it was doing with the client before the first server 310 failed. In cases where this is not done properly, the traffic cache manager 302 can assist the second server 320 to ensure connection takeover for the client.

The traffic cache manger 302 independently caches, monitors, and/or records the transactions and acknowledgements occurring during the connection between the client and the first server 310. That is, the traffic cache manager 302 does not rely on the first server 310 and its ability to record and note the transactions and acknowledgments in the synchronization store 301. When a failure is detected, the traffic cache manager 302 can independently update the synchronization store 301 to include the actual sequence number for the actual last transaction or acknowledgement.

Example processing associated with the traffic cache manager 302 was presented above with respect to the connection takeover service represented by the method 100 of the FIG. 1.

According to an embodiment, the remote authorization system 300 may also include an arrangement that includes a network switch 303 and a network router 304. The network router 304 receives traffic off the Internet from the client that is destined from the first server 310 and injects traffic into the Internet from the first server 310 that is destined from the client. The network router 304 forwards traffic within the local environment of the remote authorization system 300 to the network switch 303 and the traffic from the network switch 303 is routed to the first server 310 and also intercepted or routed to the traffic cache manager 302. So, the traffic cache manager 302 can monitor traffic being injected and forced out of the local environment of the remote authorization system 300 by monitoring the network switch 303. Thus, the traffic cache manager 302 does not have to rely on the efficiency of the first server 310 in making proper recordation of the transactions and acknowledgments in the synchronization store 301.

According to an embodiment, the remote authorization system 300 may also include a failover service 305 that serves as an interface to the synchronization store 301. The failover service 305 maintains the synchronization store 301 and requests updates for a last recorded sequence number of a transaction or acknowledgement from the traffic manager 302 when the first server 310 fails and when the second server 320 is transparently taking over the connection with the client.

Figure 4:
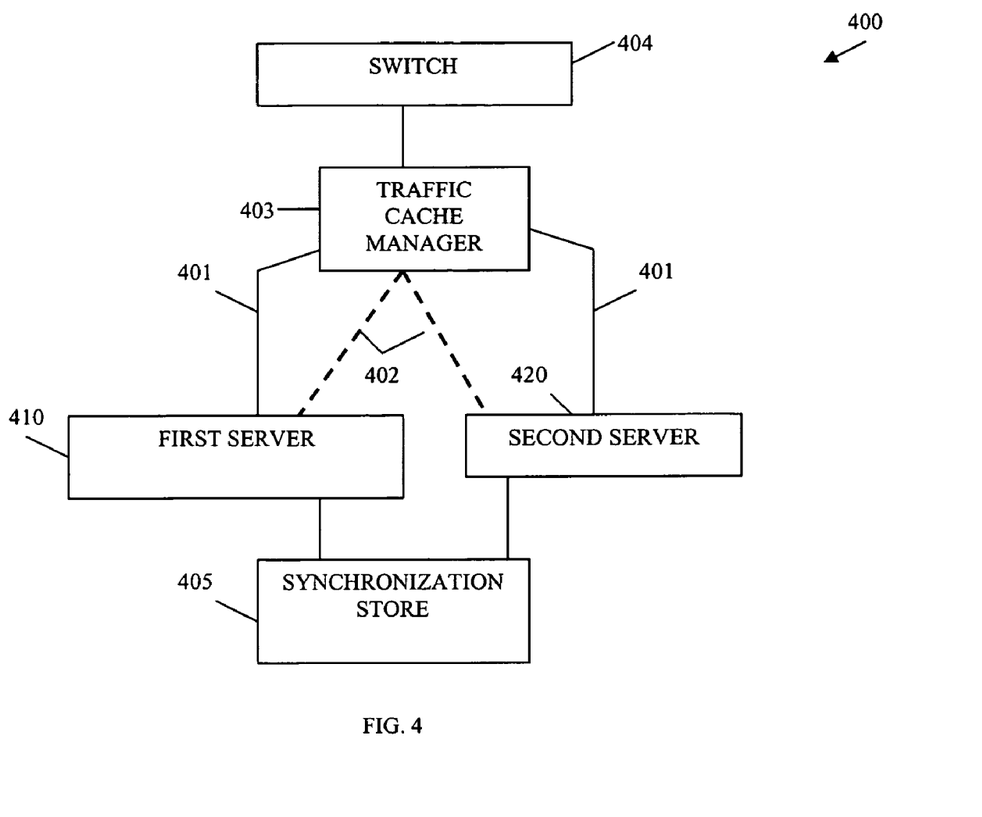
FIG. 4 is a diagram of another network connection takeover system, according to an example embodiment.

FIG. 4 is a diagram of another network connection takeover system 400, according to an example embodiment. The remote authorization system 400 is implemented in a machine-accessible and readable medium and is accessed and processed over a network. The network may be wired, wireless, or a combination of wired and wireless. The remote authorization system 400 implements, among other things, the failover service represented by the method 200 of the FIG. 2.

The remote authorization system 400 includes a first network 401, a second network 402, and a traffic cache manager 403. In some embodiments, the remote authorization system 400 may also include a network switch 404 and/or a synchronization store 405. The environment of the remote authorization system 400 also includes a first server 410 and a second server 420. Each of these will now be discussed in turn.

The first network 401 is communication channels and mechanisms used within the local environment of the remote authorization system 400 to communicate traffic received from the Internet from a client and to inject into the Internet traffic in response to actions of the client. The client maintains a connection with the first server 410.

The second network 402 is communication channels that do not include traffic associated with the client connection. In some cases, the second network 402 is separate physical connections to devices associated with traffic cache manager 403 and the first server 410 and the second server 420. In fact, in an embodiment, the second network 402 are local bus connections from a device that processes the traffic cache manager 403 to the first server 410 and the second server 420. The second network 402 may also be high-speed connections maintained between the traffic cache manager 403 and the first server 410 and the second server 420. The second network 402 is used to update current sequence numbers associated with transactions or acknowledgments occurring over the connection with the client and the first server 410 when the first server 410 becomes unresponsive of fails.

The traffic cache manager 403 processes in a manner similar to what was described in detail above with respect to the failover server represented by the method 200 of the FIG. 2. More particularly, the traffic cache manger 403 is intejected in between the first server 410 and its communications with a client. In some cases, this may mean that the device associated with the traffic cache manager 403 is positioned immediately after or as the destination for a network switch 404. The traffic cache manager 403 then forwards or relays traffic from the switch 404 to the first server 410 and vice versa.

According to an embodiment, the remote authorization system 400 may also include a synchronization store 405. The synchronization store 405 records transaction and acknowledgment sequence numbers and other data associated with the transactions for the connection between the client and the first server 410. The first server 410 directly records this information in the synchronization store 405. In this regard, the synchronization store may be stale or may not be updated properly when the first server 410 fails or becomes unacceptably unresponsive. The second server 420 consults the synchronization store when it is designated to takeover the connection for the first server 410. The synchronization store 405 is used to acquire a last recorded sequence number. The last recorded sequence number is supplied to or compared against an actual sequence number obtained by the second server 420 over the second network 402 from the traffic cache manager 403.

It is to be understood that although the disclosure was discussed with reference to a first and second server and a single connection that the invention is not to be so limited. That is, this description was presented for purposes of illustration and comprehension; one of ordinary skill in the art readily appreciates that multiple connections and a plurality of servers may be managed and maintained with the teachings presented herein.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   monitoring, over a network on a front-end of a first server, a connection between the first server and a client;
   detecting that the first server is unresponsive, the detection is made when a second server that is trying to take over for the first server makes a request for a current sequence number for transactions occurring between the client and the first server; and
   updating a database when a last recorded sequence number in a synchronization store is less than the current sequence number associated with a last transaction.

2. The method of claim 1, wherein monitoring further includes recording acknowledgment identifiers for transactions which are sent by the first server to the client.

3. The method of claim 2, wherein monitoring further includes intercepting the acknowledgement identifiers as they are being sent to the client from the first server over the front-end, wherein the front-end includes a network interface device that is least one of a network router, a network bridge, and a network switch.

4. The method of claim 1, wherein detecting further includes receiving the current sequence number from a failover service associated with the database when the first server is unresponsive for purposes of moving the connection to the second server.

5. The method of claim 1, wherein detecting further includes receiving the current sequence number from the second server that is taking over the connection for the first server.

6. The method of claim 1, wherein updating further includes accessing the database from both memory and storage.

7. The method of claim 1, wherein updating further includes interacting with a failover service to update the database.

8. A method, comprising:
   monitoring transactions for a connection between a first server and a client over a first network; and
   interacting with the first server and a second server over a second network to supply the second server with a current sequence number for the transactions of the connection when the first server becomes unresponsive and the second server is taking over the connection, the second network is separate and independent from the first network, and the second server consults a synchronization store for purposes of determining whether a last recorded sequence number for a particular transaction or a particular acknowledgment noted by the first server is available from the synchronization store, the first server is noticed as having failed when the second server makes a request for a current transaction number for the transactions.

9. The method of claim 8 further comprising, supplying the current sequence number in response to the second server providing the last recorded sequence number that the second server acquired from the shared connection store.

10. The method of claim 8, wherein monitoring further includes intercepting the transactions received over the first network from a network switch.

11. The method of claim 10, wherein monitoring further includes forwarding the transactions to the first server.

12. The method of claim 8, wherein monitoring further includes caching the transactions.

13. The method of claim 8, wherein interacting further includes using the second network as a connection to the first and second servers that does not process the transactions.

14. The method of claim 13, wherein interacting further includes using the second network as local bus connections to the first and second servers.

15. A system, comprising:
    a synchronization store; and
    a traffic cache manager, the synchronization store records sequence numbers for transactions occurring with a connection between a first server and a client over a network as communicated by the first server to the synchronization store, and the traffic cache manager is to independently cache the transactions from a network switch before the first server receives the transactions, and the traffic cache manager is to update the sequence numbers and the transactions when the first server fails and a second server takes over the connection, detection of the first server failing is noted when the second server that is taking over makes a request to the traffic cache manager for a current sequence number for the transactions.

16. The system of claim 15 further comprising, the network switch that routes the transactions to the first server.

17. The system of claim 16 further comprising, a router that interacts with the network switch and the Internet to communicate with the client.

18. The system of claim 15 further comprising, a failover service that maintains the synchronization store and that interacts with the traffic cache manager when the first server is unresponsive to update the sequence numbers and the transactions before the second server takes over the connection.

19. A system, comprising:
    a first network;
    a second network;
    a synchronization store that a second server interrogates to acquire a last recorded sequence number when a first server becomes unresponsive; and
    a traffic cache manager, wherein the first network is used for communicating transactions and traffic associated with an Internet connection between the first server and a client, and the second network is used for updating sequence numbers associated with the transactions when the first server becomes unresponsive to permit the second server to takeover the connection with the client, the second server does not include the Internet traffic between the first server and the client, and the traffic manager caches the transactions and the traffic from the first network and updates the sequence numbers of the transactions for the second server over the second network, the traffic cache manager becomes aware of the failing first server when the second server makes a request of the traffic cache manager for a current sequence number for the transactions.

20. The system of claim 19 further comprising, a network switch that forwards the transactions and the traffic to the traffic cache manager, and wherein the traffic cache manager forwards the transactions and the traffic to the first server.

21. The system of claim 19, wherein the first server is to record the sequence numbers for the transactions and the traffic in the synchronization store.

22. The system of claim 19, wherein the second network is local bus connections between the traffic manager and the first and second servers.

23. The system of claim 19, wherein the second network does not include communications associated with the transactions and the traffic.

* * * * *